Jan. 8, 1935.  E. W. SWARTWOUT  1,986,986
GOVERNOR METER
Filed Aug. 9, 1930  3 Sheets-Sheet 1

INVENTOR
Everett W. Swartwout
BY
HIS ATTORNEY

Jan. 8, 1935.　　　　E. W. SWARTWOUT　　　　1,986,986
GOVERNOR METER
Filed Aug. 9, 1930　　　　3 Sheets-Sheet 2
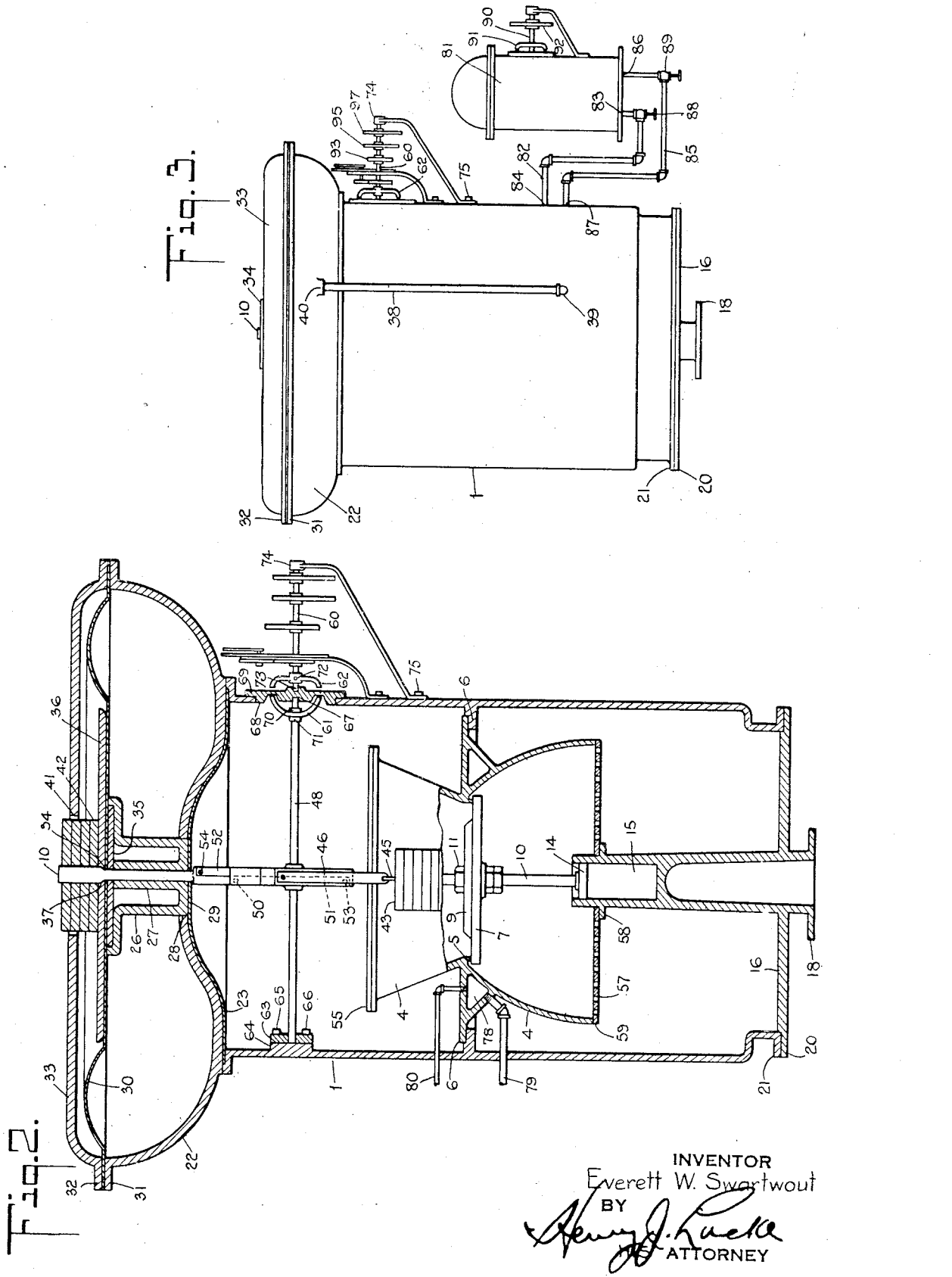

Jan. 8, 1935. E. W. SWARTWOUT 1,986,986
GOVERNOR METER
Filed Aug. 9, 1930 3 Sheets-Sheet 3
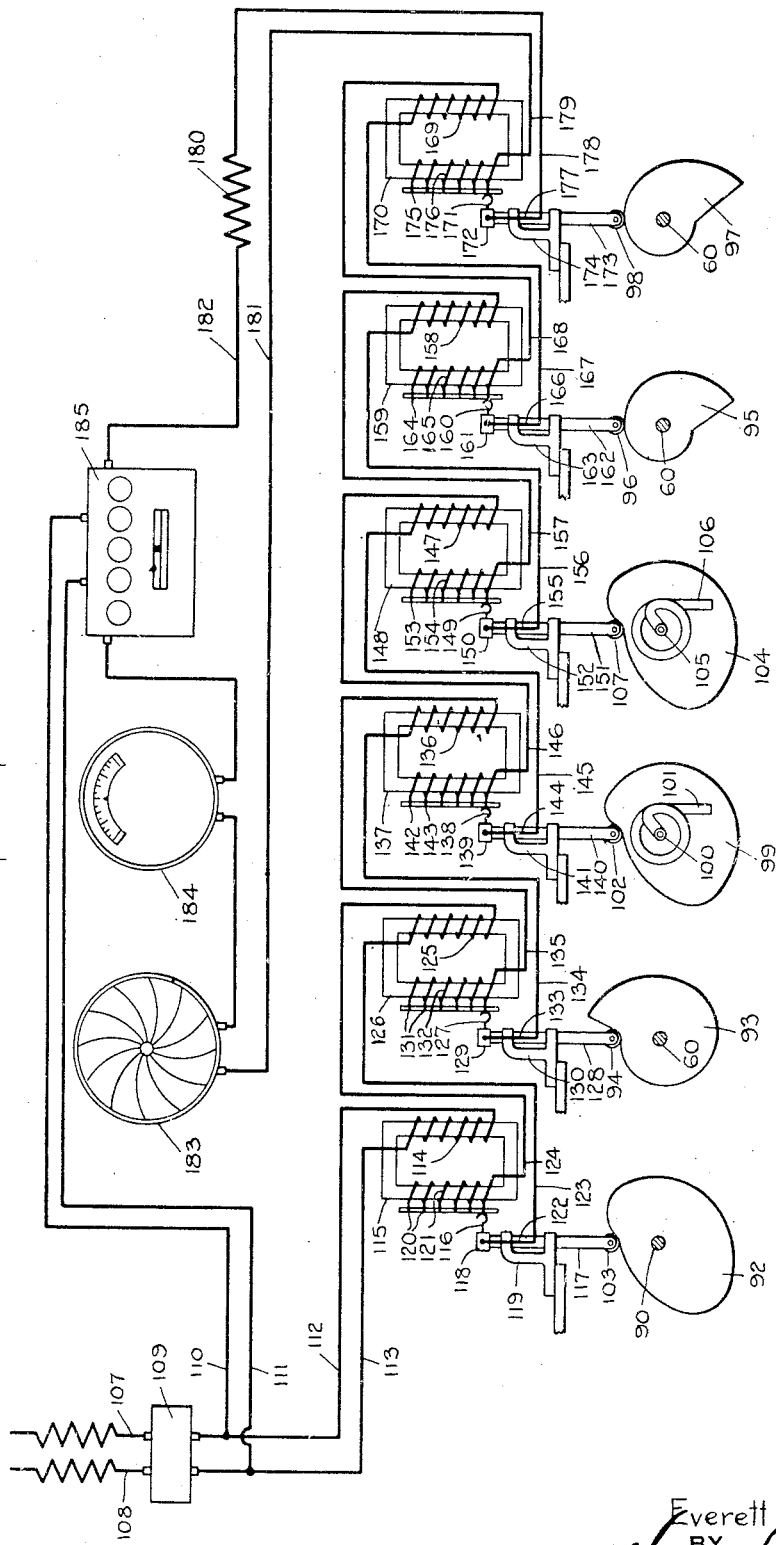
INVENTOR
Everett W. Swartwout
BY
ATTORNEY Patented Jan. 8, 1935

1,986,986

UNITED STATES PATENT OFFICE 1,986,986

GOVERNOR-METER

Everett W. Swartwout, White Plains, N. Y.

Application August 9, 1930, Serial No. 474,263

9 Claims. (Cl. 73—167)

My invention relates to devices which both govern and meter.

More particularly, my invention relates to meters in which the condition of the fluid in the outlet pipe is maintained in response to desired predetermined physical condition such as pressure, temperature, density, differential pressure, and the like as when mixing gases and when supplying gas to a district, and accordingly subject to varying consumption requirements.

An object of my invention is to provide a rate of flow meter which may be of the area or geometric type with means for operating the same at rates of flow which vary so that the desired condition may be maintained at the outlet side, and also, means for measuring the quantities resulting from said varying rates of flow.

Another object of my invention is to provide a meter with means for operating it at rates of flow which vary so that a desired physical condition may be maintained by the meter at the outlet side, with means for obtaining impulses corresponding to the area, pressure, differential pressure, temperature, density, volume and incidental factors, and means for converting such impulses, and for combining and arranging the same to be observed, recorded and derived in terms of rate of flow and quantity in predetermined standard or other desired units of measurement.

For the purpose of illustrating an application of my invention I have shown a pressure responsive meter in which the rate of flow is varied and measured in standard units of quantity, while at the same time the pressure in the outlet is maintained constant.

Further features and objects of my invention will be more fully understood from the following detail description of the accompanying drawings, in which Fig. 1 is a vertical central elevation of a primary device controlling the rate of flow, pursuant to my invention;

Fig. 2 is a similar elevation of the primary device shown in Fig. 1, taken on a plane at right angles to that of Fig. 1;

Fig. 3 is a side elevation corresponding in position to Fig. 2, on a reduced scale, with additional details; and Fig. 4 is a diagrammatic assembly in view of the apparatus for transforming primary impulses into electrical impulses, and for combining the same into desired final results.

Figure 1:
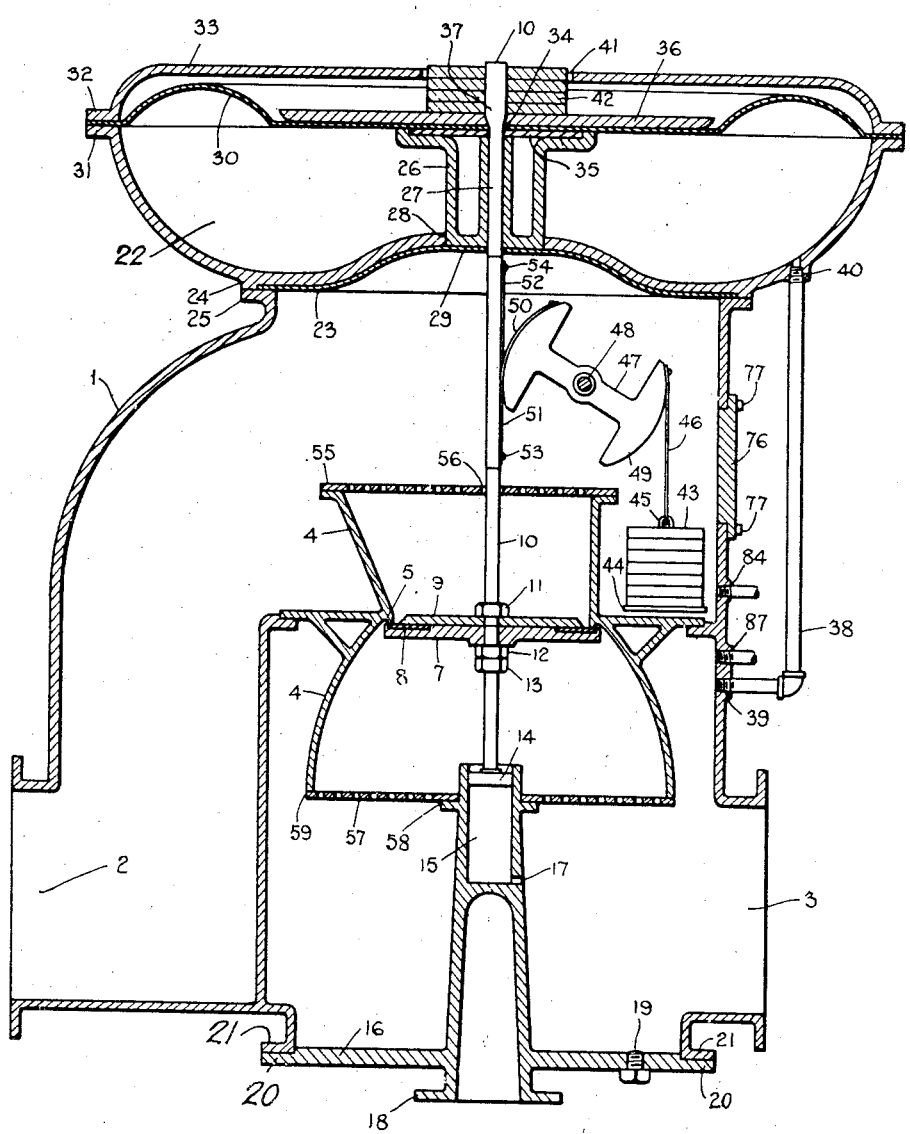

According to my invention, the flow at any instant is directly proportional to the area A exposed; the equation expressing the differential pressure H, the absolute inlet pressure P, the absolute inlet temperature T, the density or specific gravity G, and the constants K, F, C for each instant may be written:

$$Q = AKFC\sqrt{H}\sqrt{P}\sqrt{\frac{1}{T}}\sqrt{\frac{1}{G}}$$

The density G may be constant and this factor will then be of a constant value. The coefficient F may be used to correct for geometrical values derived from the ratio of the area of the two sections of the flow stream between which the difference of head is taken. The coefficient C may be the coefficient of flow to account for changes of friction and contraction of the area of the stream flow. The coefficient K may be a velocity coefficient.

Referring to Figures 1 and 2 of the drawings, the meter regulator body 1 is provided with the inlet 2 and the outlet 3. The valve seat chamber 4 having the valve seat 5 is suitably mounted within the body 1 on the flange 6. The valve 7 is provided with a removable ring seat 8 and the cover plate 9, and is attached to the shaft 10 by the nuts 11, 12 and 13. The shaft 10 is guided at its one end with the plunger 14 operating in the cylinder 15, which may also form a part of the bottom section 16. The cylinder 15 is also provided with the opening 17, which may be of such size as to operate with the plunger 14 as a dash-pot.

The base 16 may have the foot 18 for supporting it upon a suitable foundation. The base 16 is provided with the plug 19 so that drainage may be effected when desired. The base 16 is connected with the body 1 at the flanges 20, 21.

Attached to the upper end of the body 1, is the pressure compartment 22, forming a joint with the body 1 with the diaphragm gasket 23 and the flanges 24, 25. The piston 26 may be screwed to the shaft 10 at the joint 27. The piston 26 is guided in the opening 28 of the section 22 and fits tightly against the diaphragm 23 at its face 29. The diaphragm 30 is retained in position between the flange 31 of the section 22 and the flange 32 of the top 33. The shaft 10 protrudes through the diaphragm 30 at the opening 34, and its motion is transmitted on one side of the diaphragm 30 to the shaft 10, together with the plate 35 formed into the piston 26, and on the other side of the diaphragm 30 with the plate 36 joined with the shaft 10 at the beveled joint 37.

The pipe 38, see Figs. 1 and 3, connects the outlet side of the interior of the body 1 through the opening 39 at its one end and at its other end connects with the pressure compartment 22 through the opening 40, thus subjecting the space between the compartment 22 and the diaphragm 30 to the outlet pressure of the body 1 at the opening 3.

The area of the diaphragm 30 exposed to the outlet pressure within the compartment 22 may be of any desired size to produce any desired force on the shaft 10 controlling the operation of the valve 7. The pressure between the diaphragm 30 and the compartment 22 is counterbalanced with atmospheric pressure between the diaphragm 30 and the cover 33, through the vent opening 41.

The forces operating on the shaft 10 due to the pressure between the diaphragm 30 and the compartment 22 is of a desired amount, to produce a desired pressure at the outlet 3, with the use of the weights 42 and the weights 43. The number of weights 42, 43 may be varied, when desired, to produce different pressures at the outlet 3 by controlling the extent of opening of the valve 7 relative to the valve seat 5. The weights 43 may be carried on the plate 44 suspended by the eye-rod 45 and the flexible connection 46, the latter being suspended by the rocker 47 mounted on its shaft 48. The rocker 47 has a cam face 49 to which the flexible connection 46 is secured, and an arcuate face 50 and flexible connections 51, 52 for connection with the shaft 10 by the pins 53, 54. The cam face 49 of the rocker 47 may be varied to suit different degrees of opening between the valve 7 and the valve seat 5, thus insuring the proper counterbalancing of the valve 7, whereby irrespective of the pressure at the inlet 2 of the body 1, a reduction of pressure results in the gas passing through the restricted opening between the valve 7 and the valve seat 5, and a predetermined desired pressure is created at the outlet 3 to effect what is herein termed "governing".

The valve seat chamber 4 may be covered at its upper end by a perforated plate 55 having the additional opening 56 for affording movement of the shaft 10 and so that the gas flow stream entering the body 1 may be divided and straightened out to uniformly approach and affect the valve 7. Likewise, a lower, perforated plate 57 may be supported on the flange 58 of the bottom section 16 so that a reasonably close connection is made between the perforated outlet plate 57 and the section 4 at the joint 59.

The preceding description illustrates the functioning of my device as a gas governor. According to my invention, the apparatus not only governs in response to a desired outlet condition, but it also meters the quantities passing through the devices to effect a desired outlet condition. For purposes of simplicity, I have only illustrated one embodiment of my invention, namely, a device responsive to outlet pressure. It will be understood that the piping 38, the body 22, the diaphragm 30 and incidental operating equipment effecting the position of the shaft 10 and the valve 7 may be substituted by equivalent or other mechanism, so that the apparatus responsive to the outer physical conditions of the gas at the outlet 3 serve to control the movement of the shaft 10.

The method of metering the gas passing between the valve 7 and its seat 8, and the valve seat 5 is similar to the principles employed in my co-pending application, Serial Number 471,913, filed July 31, 1930, entitled Meters.

The shaft 48 is rotated in correspondence to the degree of opening between the valve seat 5 and the valve 7. The shaft 48 may pass from the interior of the body 1 through a suitable stuffing box, or it may transmit motion to the auxiliary exterior shaft 60 through the magnet 61, see Fig. 2, attached to the shaft 48 and the magnet 62 attached to the shaft 60 by the pin 72, thus reproducing the motion of the shaft 48 in the shaft 60 the same as though it were one continuous shaft.

The shaft 48 has a bearing at its one end in the block 63, secured against the boss 64 of the body 1 by the nuts 65, 66. The shaft 48 has a bearing at its opposite end 67 in the copper block 68. The copper block 68 is attached to the body 1 at the joint 69. The magnet 61 may be attached to the shaft 48 by the nuts 70, 71.

The magnet 62 is attached to the shaft 60 by the pin 72. The shaft 60 has a bearing 73 in the copper block 68 at its one end and at its opposite end in the bracket 74 attached to the body 1 by the bolts 75.

The manhole plate 76 attached to the body 1 by the bolts 77, see Fig. 1, is supplied so that parts within the body 1 may be accessible when desired.

The valve seat guide section 4 may be provided with steam jacket 78 supplied with steam pipe 79, and the vent 80 to warm the adjacent parts and to free the valve seat 5 and the ring 8 of the valve 7 of accumulations of impurities, as for example during a period when the apparatus might be out of service.

Referring to Fig. 3 and Fig. 4, the method of measuring the quantities passing through the opening formed between the valve seat 5 and the valve parts 7, 8, see Figs. 1 and 2, will now be described, similar reference characters designating similar parts.

The meter regulator body 1 is connected with the differential pressure gage 81 by the piping 82 connected at one end with the opening 83 of the differential gage 81 and at its other end with the opening 84 of the meter body 1. Referring to Fig. 1, it will be observed that the opening 84 connects with the region in which the pressure of the gas is at the higher value that is, the inlet pressure supplied at the opening 2, i. e., before the gas passes through the opening formed between the valve parts 7, 8 and the valve seat 5. The low pressure side of the differential gage 81 is connected at one end with the piping 85 leading to the inlet 86 of the differential gage 81 and at its other end with the opening 87 of the regulator meter regulating body 1.

The piping 82 may be provided with the drain valve 88 and the piping 85 may be provided with the drain valve 89 to blow out these pipes whenever desired.

Referring to Fig. 1, it will be observed that the opening 87 connects with the region of the meter regulating body 1 in which the outlet pressure is maintained in correspondence to the pressure at the outlet 3. Thus the differential pressure across the valve parts 7, 8, and the valve seat 5, as well as the differential pressure between that existing at the inlet 2 and at the outlet 3, is measured corresponding to the different conditions as they vary in the operation of the device.

The differential pressure gage 81 may be similar to that described in my co-pending application Serial Number 471,645, filed July 30, 1930, entitled Differential gages, or it may be of any other standard type.

The shaft 90 may be continued from within the differential gage 81 through a stuffing box, or operated by movement of the magnet 91 in correspondence with similar movements of internal parts, as will be understood, thus giving motion to the cam 92, see Fig. 4, corresponding to differential pressure between the high pressure inlet opening 2 and the relatively low pressure outlet 3 of the body 1. The device in the particular form as shown represents, when metering, a rate of flow meter of the geometric area type with means for constantly making instantaneous corrections in the final results accounting for variations caused by variations of the physical characteristics of the gas entering into the opening 2 and discharging through the opening 3. For this purpose, I have provided means for obtaining impulses in response to the physical characteristics of the gas passing through the meter regulator body 1 and means for transforming these mechanical impulses into electrical impulses, that is, of a common kind which may be combined to produce final results in desired predetermined standards of measurement.

The cam 93, calibrated for rate of flow, is connected with the shaft 60 so that its varying angular positions effect motion of its roller 94 in correspondence to the extent of opening between the valve seat 5 and the valve parts 7, 8.

The effects of coefficient F are obtained by mounting its calibrated cam 95 on the shaft 60 so that angular movement of the cam 95 in response to movement of the shaft 60 produces movement of its roller 96 in accordance with the extent of opening between the valve seat 5 and the valve parts 7, 8. Likewise, the effect of coefficient C is obtained by mounting the calibrated cam 97 on the shaft 60, thus giving motion to its roller 98 in correspondence to the extent of opening between the valve seat 5 and the valve parts 7, 8.

The effect of changes of the absolute initial pressure P at the inlet 2 of the body 1 is obtained with the calibrated cam 99 operating on the shaft 100 varied in its angular position by a pressure device such as a Bourdon tube 101, or equivalent, thus giving, through angular motion of the cam 99, motion of the roller 102 in proportion to $$\sqrt{P}$$

The contour of the cam 92 is calibrated so that its angular motion gives motion to its roller 103 in correspondence to $$\sqrt{H}$$

The cam 104 operating on the shaft 105 is varied in its angular positions by a temperature device such as a Bourdon tube 106, or equivalent. Angular motion of the cam 104 gives motion to its roller 107 in correspondence to $$-\sqrt{\frac{1}{T}}$$

The impulses imparted to rollers 103, 94, 102, 107, 96 and 98, are in correspondence to the respective physical characteristics of the fluid metered, and are transformed electrically through transformers so that the final voltage represents the "solution" of the equation of the device for the fluid metered. With constant resistance, the current flowing is in proportion to the voltage, and as illustrated, a recording ammeter may be provided to record rate of flow, an indicating ammeter to indicate the rate of flow and a current meter to integrate the rate of flow and give the total quantities passed in any given time.

Referring to Fig. 4, the electrical energy is supplied from a suitable source by the leads 107, 108, through the voltage regulator 109 for supplying constant voltage to the leads 110, 111, 112, 113. The primary winding 114 of the voltage transformer 115 is supplied with the voltage of the leads 112, 113, connected thereto. The shoe 116 is connected with the shaft 117 through the insulating block 118, and is guided by the bracket 119; the movement of the shoe 116 against the taps 120 of the secondary winding 121 of the voltage transformer 115 is in response to the movement of the roller 103 on the cam 92, thus varying the number of turns of the secondary winding 121 in correspondence to $$\sqrt{H}$$

Current at the derived voltage of the secondary winding 121 is now transferred through the flexible connection 122 and the leads 123, 124 to the primary winding 125 of the next voltage transformer 126 of the series.

The shoe 127 is connected with the shaft 128 through the insulating block 129 and is guided by the bracket 130; the shoe 127 connects with the taps 131 of the secondary winding 132 of the voltage transformer 126, so that the ratio of the number of turns of the secondary winding 132 to the primary winding 125 is in correspondence to movement of the roller 94 against the cam 93, thus making the ratio of voltage of the voltage transformer 126 to correspond with changes in area of the opening between the valve seat 5 of the valve parts 7, 8.

The effective voltage of the secondary winding 132 of the transformer 126 is conveyed through the flexible connection 133 and the leads 134, 135 to the primary winding 136 of the voltage transformer 137. The shoe 138 attached to the insulating block 139 is connected with the shaft 140, and is guided by the bracket 141, so that the shoe 138 connects with the taps 142 of the secondary winding 143 of the voltage transformer 137 in correspondence to the ratio of the number of turns of secondary winding 143 in proportion to the number of turns of the primary winding, and in correspondence to the movement of the roller 102 operating on the cam 99, thus making the ratio of voltage of the transformer 137 to correspond with $$\sqrt{P}$$

The flexible connection 144 and the leads 145, 146 convey the effective secondary winding voltage of the voltage transformer 137 to the primary winding 147 of the transformer 148. The shoe 149 connected with the insulating block 150 and the shaft 151 is guided by the bracket 152, to connect with the taps 153 of the secondary winding 154 of the transformer 148, in correspondence to the ratio of the effective number of turns of the secondary winding of the voltage transformer 148 in proportion to the number of turns of the primary winding 147, and in correspondence to the motion of the roller 107 operating on the cam 104, thus making the ratio of the voltage of the voltage transformer 148 in correspondence to $$\sqrt{\frac{1}{T}}$$

The voltage of the secondary winding 154 of the voltage transformer 148 is conveyed through the flexible connection 155 and the leads 156, 157, to the primary winding 158 of the voltage transformer 159. The shoe 160 is connected with the insulating block 161 and the shaft 162, guided by the bracket 163, so that the shoe 160 makes contact with the taps 164 of the secondary winding 165 of the voltage transformer 159, in correspondence to the ratio of the number of effective turns in the secondary winding 165 to the number of turns in the primary winding 158 and in correspondence to the motion of the roller 96 against the cam 95, thus varying the ratio of voltage of the voltage transformer 159 in correspondence with the coefficient F.

The secondary winding voltage of the voltage transformer 159 is now conveyed through the flexible connection 166 and the leads 167, 168 to the primary winding 169 of the voltage transformer 170. The shoe 171 is connected with the insulating block 172 and with the shaft 173 guided in the bracket 174 so that the shoe 171 makes contact with the taps 175 of the secondary winding 176 of the voltage transformer 170 so that the effective ratio of the number of turns of the secondary winding 176 in proportion to the number of turns in the primary winding 169 of the voltage transformer 170, and in accordance with the movement of the roller 98, operating on the cam 97, thus making the effective voltage ratio of the voltage transformer 170 to correspond with coefficient C.

It will be understood that the contour of the cams 92, 93, 99, 104, 95, 97, are calibrated, i. e., modified to compensate for inefficiencies in the respective voltage transformers 115, 126, 137, 148, 159, 170, as well as for variations arising from the characteristics which they respectively represent, so that the combined effects of the voltage transformers operating in series relationship with variations of the ratio of the number of turns of the primary windings to that of the secondary windings respectively preserve the accuracy of the combination to obtain the desired results.

The flexible connection 177 and the leads 178, 179, convey the effective voltage of the secondary winding 176 of the transformer 170, through the resistance 180, and the leads 181, 182, to the recording ammeter 183, and the indicating ammeter 184, and the integrating, totalizing, or current meter 185, so that the meters 183, 184, 185, read in terms of the final results under the standard or other desired conditions.

The leads 110, 111, supply current to the coils of the current meter 185, so that such coils may be used, if desired, in lieu of permanent magnets in the current meter 185. Thus, I have illustrated and described apparatus which control the pressure of gas passing through it to a predetermined desired result, and at the same time, I have provided means for measuring the quantity of gas or other fluid passing therethrough. With such type of apparatus, gas may be supplied at varying pressure to a district requiring a relatively low pressure and at the same time the amount of gas supplied to the district is measured. Likewise, it will be understood that similar equipment may be supplied to operate in response to variations of other physical conditions.

From the above, it will be apparent that the adjustment of the weights 42, 43, the flow of the fluid through the opening tube and the entry passage of the meter and thence through the valve opening past the valve 7 displaceable relative to its valve seat 5, and eventually through the outlet 3. This feature of my invention contributes the function of governing the flow of the fluid and by reason of its adjustability enables the flow to be adjusted.

The metering of the fluid is effected upon the extent of displacement of the valve 7 to its valve seat 5, the valve 7 being displaced to a position of stable equilibrium relative to the force of the adjustable weight 43 operating on the cam face 49 of the cam element 47. It will be observed that the cam face 49 effectively increases radially upon counter-clockwise movement of the cam element 47, viewed in Fig. 1, ensuing upon downward displacement of the valve 7.

It will be understood that the shape of the effective cam surface 49 may be varied as desired, similar to modification as described and claimed in my co-pending application Serial No. 471,913, filed July 31, 1930, entitled Meters.

Whereas, I have described my invention by reference to specific forms thereof, it will be understood that many changes and modifications may be made without departing from the spirit of the invention.

I claim.

1. A combined governor and meter comprising a casing provided with inlet and outlet openings arranged to be connected with a pipe line, inflow passage means disposed in said casing, outflow passage means disposed in said casing, valve means including a movable valve member controlling the communication and extent of communication between said inflow passage means and said outflow passage means, means responsive to the differential pressure of the fluid flowing through said inflow passage means and said outflow passage means, a cam calibrated for rate of flow, means controlled by said differential pressure responsive means for positioning said rate of flow calibrated cam in accordance with the differential pressure of the fluid flowing through said inflow passage means and said outflow passage means, integrating means controlled by said rate of flow calibrated cam for recording rate of flow and optionally adjustable means responsive to the pressure in the outlet passage means for controlling the extent of effective movement of said movable valve member to govern correspondingly the rate of flow of the fluid to maintain the outlet pressure constant.

2. A combined governor and meter comprising a casing provided with inlet and outlet openings arranged to be connected with a pipe line, inflow passage means disposed in said casing, outflow passage means disposed in said casing, valve means including a movable valve member controlling the communication and extent of communication between said inflow passage means and said outflow passage means, means responsive to the differential pressure of the fluid flowing through said inflow passage means and said outflow passage means, a cam calibrated for rate of flow, means controlled by said differential pressure responsive means for positioning said rate of flow calibrated cam in accordance with the differential pressure of the fluid flowing through said inflow passage means and said outflow passage means, a cam calibrated for variations of pressure, means for positioning said pressure calibrated cam in accordance with the pressure of the fluid, integrating means controlled by said cams for recording rate of flow reduced to standard pressure and optionally adjustable means responsive to the pressure in the outlet passage means for controlling the extent of effective movement of said movable valve member to govern correspondingly the rate of flow of the fluid to maintain the outlet pressure constant.

3. A combined governor and meter comprising a casing provided with inlet and outlet openings arranged to be connected with a pipe line, inflow passage means disposed in said casing, outflow passage means disposed in said casing, valve means including a movable valve member controlling the communication and extent of communication between said inflow passage means and said outflow passage means, means responsive to the differential pressure of the fluid flowing through said inflow passage means and said outflow passage means, a cam calibrated for rate of flow, means controlled by said differential pressure responsive means for positioning said rate of flow calibrated cam in accordance with the differential pressure of the fluid flowing through said inflow passage means and said outflow passage means, a cam calibrated for variations of pressure, means for positioning said pressure calibrated cam in accordance with the pressure of the fluid, a cam calibrated for variations of temperature, means for positioning said temperature calibrated cam in accordance with the temperature of the fluid, integrating means controlled by said cams for recording rate of flow reduced to standard pressure and temperature and optionally adjustable means responsive to the pressure in the outlet passage means for controlling the extent of effective movement of said movable valve member to govern correspondingly the rate of flow of the fluid to maintain the outlet pressure constant.

4. A combined governor and meter comprising a casing provided with inlet and outlet openings arranged to be connected with a pipe line, inflow passage means disposed in said casing, outflow passage means disposed in said casing, valve means including a movable valve member controlling the communication and extent of communication between said inflow passage means and said outflow passage means, means responsive to the differential pressure of the fluid flowing through said inflow passage means and said outflow passage means, a cam calibrated for rate of flow, means controlled by said differential pressure responsive means for positioning said rate of flow calibrated cam in accordance with the differential pressure of the fluid flowing through said inflow passage means and said outflow passage means, electrical integrating means controlled by said rate of flow calibrated cam responsive to the pressure in the outlet passage means for recording rate of flow and optionally adjustable means for controlling the extent of effective movement of said movable valve member to govern correspondingly the rate of flow of the fluid to maintain the outlet pressure constant.

5. A combined governor and meter comprising a casing provided with inlet and outlet openings arranged to be connected with a pipe line, inflow passage means disposed in said casing, outflow passage means disposed in said casing, valve means including a movable valve member controlling the communication and extent of communication between said inflow passage means and said outflow passage means, means responsive to the differential pressure of the fluid flowing through said inflow passage means and said outflow passage means, a cam calibrated for rate of flow, means controlled by said differential pressure responsive means for positioning said rate of flow calibrated cam in accordance with the differential pressure of the fluid flowing through said inflow passage means and said outflow passage means, a cam calibrated for variations of pressure, means for positioning said pressure calibrated cam in accordance with the pressure of the fluid, electrical integrating means controlled by said cams for recording rate of flow reduced to standard pressure and optionally adjustable means responsive to the pressure in the outlet passage means for controlling the extent of effective movement of said movable valve member to govern correspondingly the rate of flow of the fluid to maintain the outlet pressure constant.

6. A combined governor and meter comprising a casing provided with inlet and outlet openings arranged to be connected with a pipe line, inflow passage means disposed in said casing, outflow passage means disposed in said casing, valve means including a movable valve member controlling the communication and extent of communication between said inflow passage means and said outflow passage means, means responsive to the differential pressure of the fluid flowing through said inflow passage means and said outflow passage means, a cam calibrated for rate of flow, means controlled by said differential pressure responsive means for positioning said rate of flow calibrated cam in accordance with the differential pressure of the fluid flowing through said inflow passage means and said outflow passage means, a cam calibrated for variations of pressure, means for positioning said pressure calibrated cam in accordance with the pressure of the fluid, a cam calibrated for variations of temperature, means for positioning said temperature calibrated cam in accordance with the temperature of the fluid, electrical integrating means controlled by said cams for recording rate of flow reduced to standard pressure and temperature and optionally adjustable means responsive to the pressure in the outlet passage means for controlling the extent of effective movement of said movable valve member to govern correspondingly the rate of flow of the fluid to maintain the outlet pressure constant.

7. A combined governor and meter comprising a casing provided with inlet and outlet openings arranged to be connected with a pipe line, inflow passage means disposed in said casing, outflow passage means disposed in said casing, valve means including a movable valve member controlling the communication and extent of communication between said inflow passage means and said outflow passage means, means responsive to the differential pressure of the fluid flowing through said inflow passage means and said outflow passage means, a cam calibrated for rate of flow, means controlled by said differential pressure responsive means for positioning said rate of flow calibrated cam in accordance with the differential pressure of the fluid flowing through said inflow passage means and said outflow passage means, electrical integrating means including transformers controlled by said rate of flow calibrated cam for recording rate of flow and optionally adjustable means responsive to the pressure in the outlet passage means for controlling the extent of effective movement of said movable valve member to govern correspondingly the rate of flow of the fluid to maintain the outlet pressure constant.

8. A combined governor and meter comprising a casing provided with inlet and outlet openings arranged to be connected with a pipe line, inflow passage means disposed in said casing, outflow passage means disposed in said casing, valve means including a movable valve member controlling the communication and extent of communication between said inflow passage means and said outflow passage means, means responsive to the differential pressure of the fluid flowing through said inflow passage means and said outflow passage means, a cam calibrated for rate of flow, means controlled by said differential pressure responsive means for positioning said rate of flow calibrated cam in accordance with the differential pressure of the fluid flowing through said inflow passage means and said outflow passage means, a cam calibrated for variations of pressure, means for positioning said pressure calibrated cam in accordance with the pressure of the fluid, electrical integrating means including transformers controlled by said cams for recording rate of flow reduced to standard pressure and optionally adjustable means responsive to the pressure in the outlet passage means for controlling the extent of effective movement of said movable valve member to govern correspondingly the rate of flow of the fluid to maintain the outlet pressure constant.

9. A combined governor and meter comprising a casing provided with inlet and outlet openings arranged to be connected with a pipe line, inflow passage means disposed in said casing, outflow passage means disposed in said casing, valve means including a movable valve member controlling the communication and extent of communication between said inflow passage means and said outflow passage means, means responsive to the differential pressure of the fluid flowing through said inflow passage means and said outflow passage means, a cam calibrated for rate of flow, means controlled by said differential pressure responsive means for positioning said rate of flow calibrated cam in accordance with the differential pressure of the fluid flowing through said inflow passage means and said outflow passage means, a cam calibrated for variations of pressure, means for positioning said pressure calibrated cam in accordance with the pressure of the fluid, a cam calibrated for variations of temperature, means for positioning said temperature calibrated cam in accordance with the temperature of the fluid, electrical integrating means including transformers controlled by said cams for recording rate of flow reduced to standard pressure and temperature and optionally adjustable means responsive to the pressure in the outlet passage means for controlling the extent of effective movement of said movable valve member to govern correspondingly the rate of flow of the fluid to maintain the outlet pressure constant.

EVERETT W. SWARTWOUT.